(12) United States Patent
Nakaguchi (10) Patent No.: US 9,900,570 B2
(45) Date of Patent: Feb. 20, 2018

(54) PROJECTOR SYSTEM AND CALIBRATION BOARD

(71) Applicants: ADVANCED HEALTHCARE CO., LTD., Tokyo (JP); NATIONAL UNIVERSITY CORPORATION CHIBA UNIVERSITY, Chiba-shi, Chiba (JP)

(72) Inventor: Toshiya Nakaguchi, Chiba (JP)

(73) Assignees: ADVANCED HEALTHCARE CO., LTD., Tokyo (JP); NATIONAL UNIVERSITY CORPORATION CHIBA UNIVERSITY, Chiba-shi, Chiba (JP)

( * ) Notice: Subject to any disclaimer, the term of this patent is extended or adjusted under 35 U.S.C. 154(b) by 78 days.

(21) Appl. No.: 15/126,976

(22) PCT Filed: Dec. 10, 2014

(86) PCT No.: PCT/JP2014/082684
§ 371 (c)(1),
(2) Date: Sep. 16, 2016

(87) PCT Pub. No.: WO2015/141080
PCT Pub. Date: Sep. 24, 2015

(65) Prior Publication Data
US 2017/0099473 A1    Apr. 6, 2017

(30) Foreign Application Priority Data

Mar. 18, 2014 (JP) ................ 2014-055068

(51) Int. Cl.
*H04N 9/31* (2006.01)
*H04N 1/00* (2006.01)

(52) U.S. Cl.
CPC ....... *H04N 9/3194* (2013.01); *H04N 1/00015* (2013.01); *H04N 1/00045* (2013.01);
(Continued)

(58) Field of Classification Search
CPC ............ H04N 9/3194; H04N 1/00015; H04N 1/00045; H04N 1/00087; H04N 9/3185; H04N 2201/0089
(Continued)

(56) References Cited

U.S. PATENT DOCUMENTS

| | | | |
|---|---|---|---|
| 2004/0095585 A1* | 5/2004 | Nayebi | B61K 9/12 356/601 |
| 2011/0149353 A1* | 6/2011 | Majewicz | H04N 1/00013 358/474 |
| 2014/0346217 A1* | 11/2014 | Nielsen | B42F 7/065 229/67.1 |

FOREIGN PATENT DOCUMENTS

| | | |
|---|---|---|
| JP | 2007-309660 A | 11/2007 |
| JP | 2009-5044 A | 1/2009 |

(Continued)

OTHER PUBLICATIONS

ISA/JP, International Search Report issued on May 12, 2015 in International Application No. PCT/JP2014/082684, total 5 pages with translation.
(Continued)

*Primary Examiner* — Michael Lee
(74) *Attorney, Agent, or Firm* — Masuvalley & Partners (57) ABSTRACT

This invention provides a simple projector system that can be operated by a user who is not an expert of image processing technology. The projector system comprises a projector (1), a personal computer (2), a mouse (3), and a calibration board (4). A checker flag pattern is added to the calibration board (4), and an intersection point serves as a marker. A cursor, which is projected from the projector (1)

(Continued)

onto the calibration board (4), is used as an intuitive input interface. An operator, while seeing the cursor, operates the mouse (3), thereby placing the cursor onto the calibration marker. In this state, the operator clicks the mouse (3), thereby selecting the calibration marker. The operator then acquires the corresponding projection image coordinates on the basis of the selection instruction.

8 Claims, 9 Drawing Sheets

(52) U.S. Cl.
 CPC ....... *H04N 1/00087* (2013.01); *H04N 9/3185* (2013.01); *H04N 2201/0089* (2013.01)

(58) Field of Classification Search
 USPC .......................................................... 348/189
 See application file for complete search history.

(56) References Cited

FOREIGN PATENT DOCUMENTS

| | | |
|---|---|---|
| JP | 2009-147480 A | 7/2009 |
| JP | 2010-204759 A | 9/2010 |
| JP | 2011-166662 A | 8/2011 |
| JP | 2014-010362 A | 1/2014 |

OTHER PUBLICATIONS

ISA/JP, Written Opinion of the International Searching Authority issued on May 12, 2015 in International Application No. PCT/JP2014/082684, Total 8 pages with translation.

\* cited by examiner

FIG. 12

PROJECTOR SYSTEM AND CALIBRATION BOARD

RELATED APPLICATIONS

This application is the U.S. National Phase application under 35 U.S.C. § 371 of International Patent Application No. PCT/JP2014/082684, filed Dec. 10, 2014, entitled "PROJECTOR SYSTEM AND CALIBRATION BOARD," which claims priority to Japanese Patent Application No. JP 2014-055068, filed Mar. 18, 2014, which are hereby expressly incorporated by reference in their entirety for all purposes.

TECHNICAL FIELD

The present invention relates to calibration and registration for a projector system.

BACKGROUND ART

Technology related to projection mapping is of current interest. A fantastic space can be produced by projecting an unrealistic image on the wall surfaces of, for example, the Tokyo station building and the Osaka Castle. Urban landscape can be visually changed by projecting an artistic image on a wall surface of a building. Events introducing the projection mapping are pleasant to the eyes of audience, and high customer-drawing power can be expected. Therefore, large economic effects can be expected.

The projection mapping is also introduced into an entertainment field because the projection of unrealistic image can give pleasure to the eyes of audience (Patent Literature 1).

CITATION LIST

Patent Literature

Patent Literature 1

JP 2004-010362A

SUMMARY OF INVENTION

Technical Problem

There was only a little opportunity that the projection mapping was introduced into the other practical fields such as an engineering field.

One of the reasons thereof is because the engineering field and the other academic fields are completely systemized one by one, and thus it is difficult to newly introduce a technology from a completely different field. That is, bad effects caused by the vertically segmented technical fields is one of the reasons. As another reason, there is difficulty in making entry into the projection mapping.

In the current practice of projection mapping technology, a video engineer having professional knowledge uses a special machine. Further, since video image appreciation is the purpose of the projection mapping, required is high accuracy. In other words, many of experts of image processing technology are of artistic temperament, who tends not to think of "practical availability shall be enough".

More specifically, when a person who is not an expert of image processing technology tries to apply the projection mapping technology, the person cannot start it with ease but requires cooperation of an expert. As a result, it is difficult to develop a new technology by combining the projection mapping technology with the existing technology.

For example, a projector requires calibration before use. Calibration of projector is achieved by an application of the conventional technology related to calibration of camera. In other words, if a relationship between a space of which position is preliminary known and a projecting point on the image of the space is found, a camera parameter can be obtained by calculation. Similarly, calibration of projector can also be calculated if the correspondency between a projection image and a spatial point where the image is projected is found.

To acquire the correspondency between a projector and a camera, a space encoding method is applied. Structural light from the projector is projected to encode a space by using binary code. Thus encoded space is decoded on the basis of the image acquired by the camera. The correspondency between pixels of the projector and pixels of the camera is checked. Accordingly, a camera image can be converted into a projector image.

In the above described method, only if a projector, a camera, and a projection object are appropriately arranged and a light source is set at a proper position, high accuracy can be achieved since operational equipment performs calibration.

The appropriate arrangement of a projector, a camera, and a projection object and a proper setting of a light source requires experiment and is difficult for a person who is not an expert of image processing technology. Further, this requires several changes of arrangement, which is difficult for an inexperienced person to make prompt re-arrangement.

In the method in which a camera is used, there was a possible problem of expansion and complication of the system.

The present invention was made in order to solve the above described problem. A purpose of the present invention is to provide a simple projector system which can be handled by a person who is not an expert of image processing technology, more specifically, by experts of different fields.

Solution to Problem

A projector system of the present invention capable of solving the above described problem includes a projector, an image processing apparatus, external input means, and a calibration board, wherein the calibration board is made of at least two plane surfaces, each plane surface including a plurality of calibration markers arranged so as to form a regular matrix, and wherein the image processing apparatus includes a projection image coordinate system setting unit for setting a coordinate system of a projection image from the projector, a cursor operating unit for operating a cursor projected from the projector on the basis of position information from the external input means, a cursor coordinates acquiring unit which determines, when the cursor moves to an arbitrary position, the arbitrary position as a selected position based on a selection instruction from the external input means and acquires projection image coordinates corresponding to the cursor at the selected position, a projector characteristics acquiring unit for acquiring projector characteristics for each plane surface on the basis of a group of a projection image coordinate points of the calibration markers acquired by the cursor operating unit and the cursor coordinates acquiring unit and a group of known spatial coordinate points of the calibration markers, and a lens characteristics acquiring unit which, on the basis of the projector characteristics of each plane surface, removes calibration board positional characteristics of each plane surface and acquires lens characteristics of the projector.

A projector system of the present invention capable of solving the above described problem includes a projector, an image processing apparatus, and external input means, wherein the image processing apparatus includes a projection image coordinate system setting unit for setting a coordinate system of a projection image from the projector, a cursor operating unit for operating a cursor projected from the projector on the basis of position information from the external input means, a cursor coordinates acquiring unit which determines, when the cursor moves to an arbitrary position, the arbitrary position as a selected position based on a selection instruction from the external input means and acquires projection image coordinates corresponding to the cursor at the selected position, a lens characteristics acquiring unit for inputting lens characteristics of the projector, a spatial coordinates inputting unit for inputting a group of spatial coordinate points of the registration markers provided on a surface of a projected object, and a projected object positional characteristics acquiring unit for acquiring projected object positional characteristics on the basis of a group of projection image coordinate points of the registration markers obtained by the cursor operating unit and the cursor coordinates acquiring unit, a group of spatial coordinates of the registration markers, and the lens characteristics.

A projector system of the present invention capable of solving the above described problem includes a projector, an image processing apparatus, and external input means, wherein the image processing apparatus includes a projection image coordinate system setting unit for setting a coordinate system of a projection image from the projector, a cursor operating unit for operating a cursor projected from the projector on the basis of position information from the external input means, and a cursor coordinates acquiring unit which acquires, when an arbitrary position is selected by the cursor operation, projection image coordinates corresponding to the cursor at the selected position based on a selection instruction from the external input means.

With the above described structure, a group of projection image coordinate points of the calibration markers or a group of projection image coordinate points of the registration markers can be acquired by the cursor operating unit and the cursor coordinates acquiring unit. More specifically, the cursor projected from the projector can be used as an intuitive coordinates input interface. As a result, simple calibration and registration can be achieved even without using a camera.

In the above described invention, more preferably, the spatial coordinates inputting unit further inputs a group of spatial coordinate points of a target within a projected object, and the image processing apparatus further includes a group of target projection image coordinate points acquiring unit which acquires a group of projection image coordinate points of target on the basis of the lens characteristics, the projected object positional characteristics, and the group of spatial coordinate points of target.

Accordingly, the target image can be projected onto the projected object with ease.

In the above described invention, more preferably, the image processing apparatus further includes a group of registration marker confirming-projection image coordinates re-acquiring unit which re-acquires a group of registration marker confirming projection image coordinate points on the basis of the lens characteristics, the projected object positional characteristics, and the group of spatial coordinate points of the registration markers.

In the above described invention, more preferably, the spatial coordinates inputting unit inputs spatial coordinates of the confirmation markers provided on a surface of the projected object, and the image processing apparatus further includes a confirmation marker projection image coordinates acquiring unit that acquires projection image coordinates of the confirmation markers on the basis of the lens characteristics, the projected object positional characteristics, and spatial coordinates of the confirmation markers.

This enables easy confirmation as to whether the registration is suitably achieved.

Advantageous Effect of Invention

The projector system of the present invention has a simple structure and can be handled by a person who is not an expert of image processing technology, more specifically, by experts of different fields. As a result, the existing technology can be improved by combining the projection mapping technology with the existing technology of every field.

DESCRIPTION OF EMBODIMENTS

<Calibration>

~Structure~

A structure related to the calibration of the present embodiment will be described below. A projector system includes a projector 1, an image processing apparatus 2, external input means 3, and a calibration board 4.

It is assumed that the projector 1 is a typical projector which is commercially available from mass retailers. In other words, the projector 1 is not a special projector that is used, for example, in an event introducing projection mapping.

It is assumed that the image processing apparatus 2 is a typical personal computer (PC) which is commercially available from mass retailers. The image processing apparatus 2 is connected to the projector 1 by wire or by wireless means.

A typical tablet type computer (tablet) which is commercially available from mass retailers may be employed as the image processing apparatus 2.

In a case where a PC is employed as the image processing apparatus 2, it is assumed that the external input means 3 is, for example, a mouse, a track ball, or a touch pad.

In a case where a tablet is employed as the image processing apparatus 2, it is assumed that the external input means 3 is a touch panel.

The calibration board 4 is made of at least two plane surfaces. For example, the calibration board 4 is made into a self-standing calibration board having three surfaces, i.e., first plane surface, second plane surface, and third plane surface (see, FIG. 3).

Figure 3:
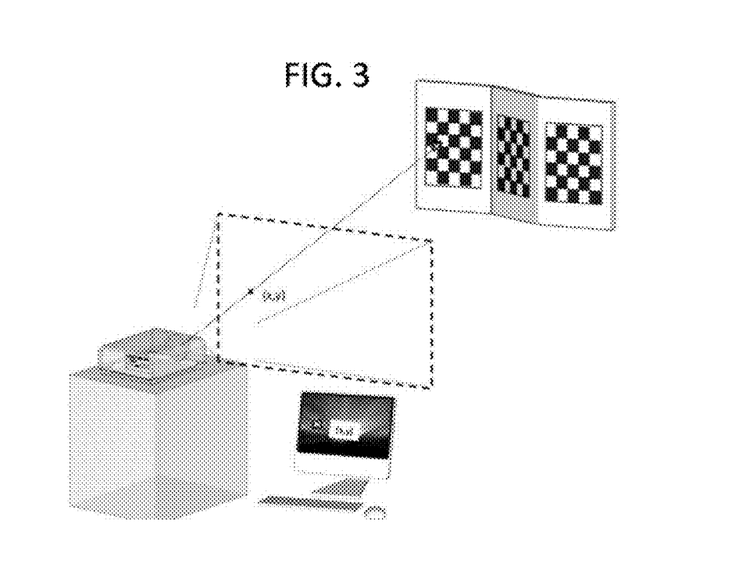
FIG. 3 is an operational conception diagram (calibration).

The first plane surface and the second plane surface are formed into a protruding shape when viewed from the front, and the second plane surface and the third plane surface are formed into a depressing shape when viewed from the front. This makes it possible for the surfaces to mate with both of the depressing shape and the protruding shape.

Each plane surface includes a plurality of calibration markers which are arranged so as to form a regular matrix.

For example, each plane surface is provided with a checker flag pattern, and each intersection point of the checker flag serves as a calibration marker.

The preferable number of the intersection points in the checker flag is 8-20 points (This will be studied below).

Figure 1:
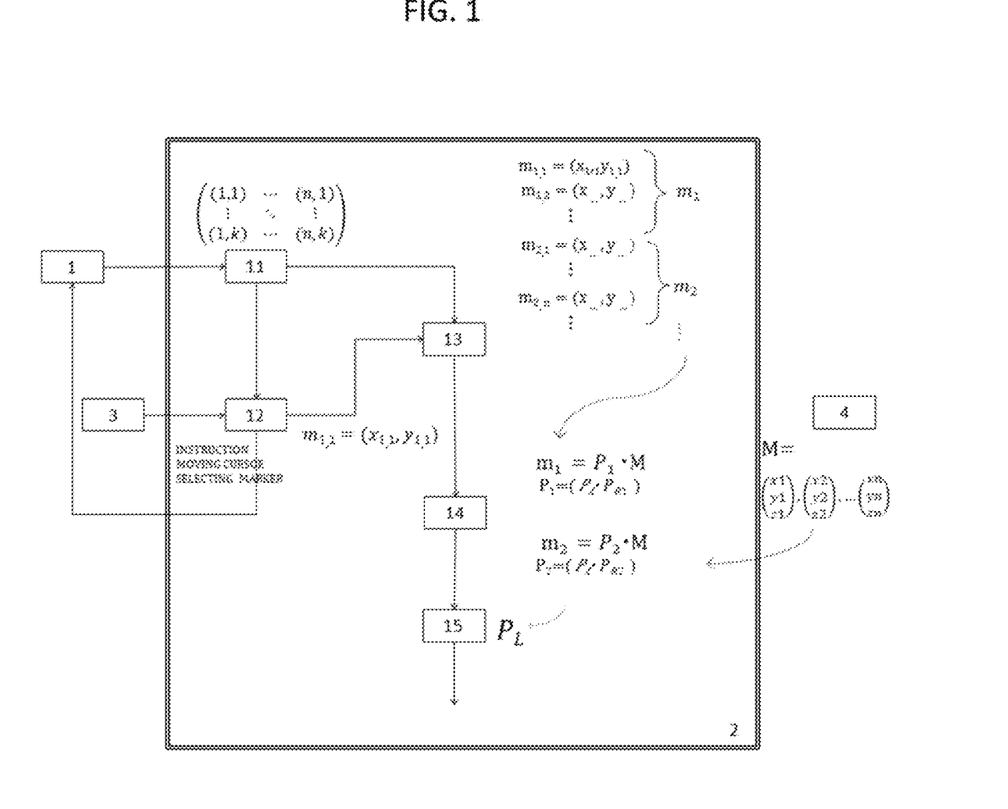
FIG. 1 is a functional block diagram of the image processing apparatus (calibration).

FIG. 1 is a functional block diagram of the image processing apparatus 2. The image processing apparatus 2 includes a projection image coordinate system setting unit 11, a cursor operating unit 12, a cursor coordinates acquiring unit 13, a projector characteristics acquiring unit 14, and a lens characteristics acquiring unit 15.

The projection image coordinate system setting unit 11 inputs pixel information of the projector 1 and sets a coordinate system of a projection image from the projector 1. The projection image coordinate system setting unit 11 sets, for example, a coordinate system of 1280×800.

In the present embodiment, a cursor projected from the projector 1 is employed as a coordinates input interface.

The cursor operating unit 12 operates a cursor in synchronization with operation of mouse 3, etc. on the basis of position information of the mouse 3. The cursor operation enables the cursor to be registered onto a calibration marker.

The cursor coordinates acquiring unit 13 determines, when the cursor exists at an arbitrary position, the arbitrary position as a selected position based on a selection instruction (e.g., a click of the mouse 3) and acquires projection image coordinates (x, y) corresponding to the cursor at the selected position. When the cursor is registered onto a calibration marker to select it, projection image coordinates of the calibration marker can be acquired.

More specifically, a group of projection image coordinate points $m_1$, $m_2$ of calibration markers can be acquired for each plane surface by the cursor operating unit 12 and the cursor coordinates acquiring unit 13. For the sake of simple description, the number of plane surfaces is 2. The group of coordinate points means coordinates of a group of points or coordinates of a group of markers.

Generally, a relationship between projection image coordinates and spatial coordinates is defined as described below. That is, $$m = P \cdot M,$$

where m is projection image coordinates, P is a matrix indicating projector characteristics, and M is spatial coordinates.

Here, on each plane surface of the calibration board 4, a plurality of calibration markers is arranged so as to form a regular matrix. A positional relationship therebetween in the regular matrix is known. Therefore, a group of spatial coordinate points M of calibration markers is known.

The projector characteristics acquiring unit 14 acquires projector characteristics P on the basis of the group of spatial coordinate points M of calibration markers and the group of projection image coordinate points $m_1$, $m_2$ of calibration markers of each plane surface.

Lens characteristics $P_L$ and positional characteristics $P_R$ are included in the projector characteristics P. The lens characteristics $P_L$ is also referred to as internal parameter. The positional characteristics $P_R$ is also referred to as external parameter.

The lens characteristics acquiring unit 15 removes calibration board positional characteristics $P_{R1}$, $P_{R2}$ of each plane surface on the basis of the projector characteristics $P_1$, $P_2$ of each plane surface and acquires the lens characteristics $P_L$ of the projector 1. More specifically, since the unknown number of the lens characteristics (internal parameter) is 5 and the unknown number of the positional characteristics (external parameter) is 6, the simultaneous equation for computing the total 11 unknown numbers is solved.

~Operation~

Figure 2:
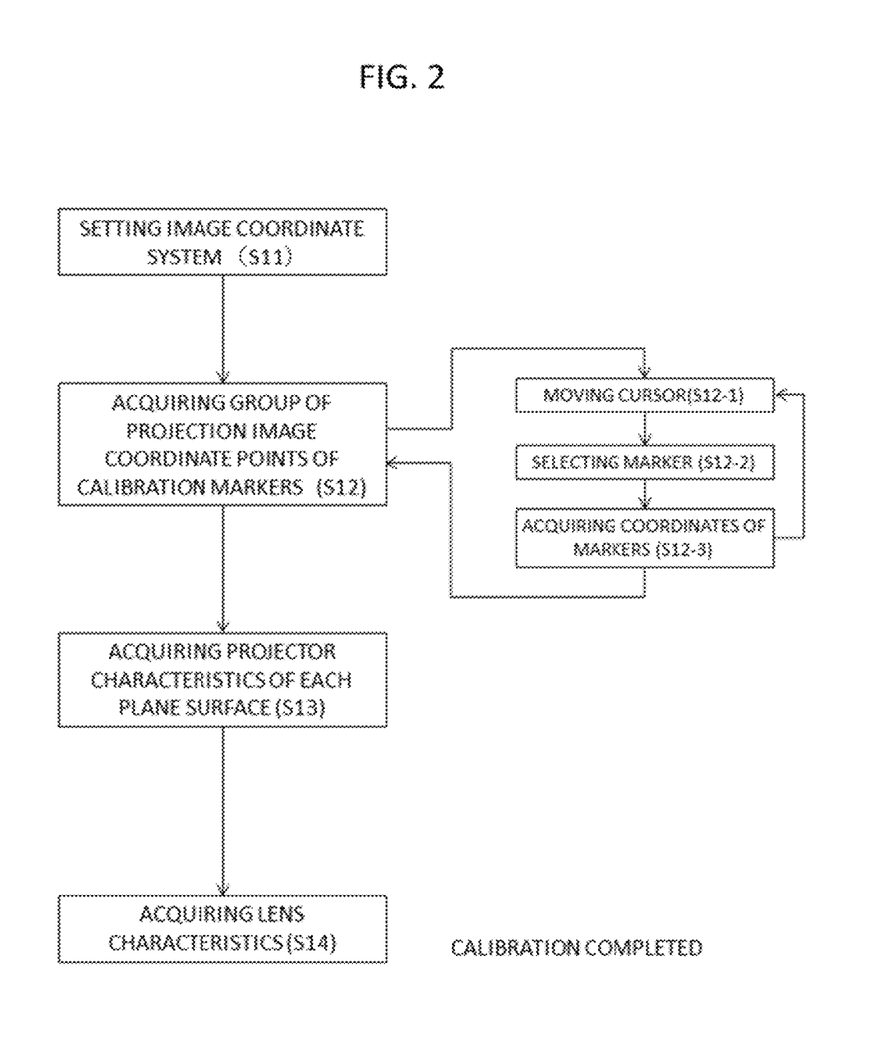
FIG. 2 is a processing flow chart of the image processing apparatus (calibration).

Operation related to the calibration of the present embodiment will be described below. FIG. 2 illustrates a processing flow of the image processing apparatus 2. FIG. 3 is an operational conception diagram related to the calibration.

The image processing apparatus 2 inputs pixel information of the projector 1 (e.g., 1280×800) and sets a coordinate system of a projection image from the projector 1 (step S11).

The calibration board 4 is placed within a projection range of the projector 1.

The projector 1 projects a cursor onto the calibration board 4.

An operator operates the mouse 3 to move the cursor in synchronization with a position of the mouse 3 (step S12-1).

The operator, while seeing the cursor, operates the mouse 3, thereby moving and placing the cursor onto a calibration marker. In this state, the operator clicks the mouse 3 to select the calibration marker (step S12-2).

Projection image coordinates corresponding to the calibration marker is acquired based on a selection instruction of the mouse 3 (step S12-3).

In FIG. 3, a dotted square suggests a projection image coordinate system.

Further, in FIG. 3, the calibration board 4 is made of three surfaces, each plane surface is provided with a checker flag pattern, and the number of intersection points of the checker flag is 4×5 (=20). A distance between the lattice points is 30×30 mm.

The image processing apparatus 2 acquires projection image coordinates corresponding to 20 calibration markers for each of the first plane surface to the third plane surface (repeating steps S12-1 to S12-3), thereby acquiring a group of projection image coordinate points $m_1$, $m_2$, . . . of calibration markers for each plane surface (step S12).

Incidentally, the group of spatial coordinate points M of calibration markers is known. The calibration marker is given as three-dimensional coordinates.

The image processing apparatus 2 acquires projector characteristics $P_1$, $P_2$ for each plane surface on the basis of the group of projection image coordinate points $m_1$, $m_2$ of calibration markers and the group of spatial coordinate points M of calibration markers (step S12).

The image processing apparatus 2 removes, on the basis of the projector characteristics $P_1$, $P_2$ of each plane surface, the calibration board positional characteristics $P_{R1}$, $P_{R2}$ of each plane surface, thereby acquiring common lens characteristics $P_L$ of the projector (step S13).

Accordingly, the calibration is completed.

~Verification of Precision~

The calibration of the present embodiment was compared with that of the conventional method (in which a camera is used), and verification of precision was performed therebetween. The precision was evaluated by re-projection error. The re-projection error is an index indicating precision of parameter obtained by calculation. As the value becomes smaller, the obtained parameter can be evaluated as more precise. The verification was performed 10 times in the conventional method. The verification was performed 6 times in the present embodiment. The present test was performed for evaluating errors and variations, so that a positional relationship between the projector and the calibration board (checker board) was changed every time.

Figure 4:
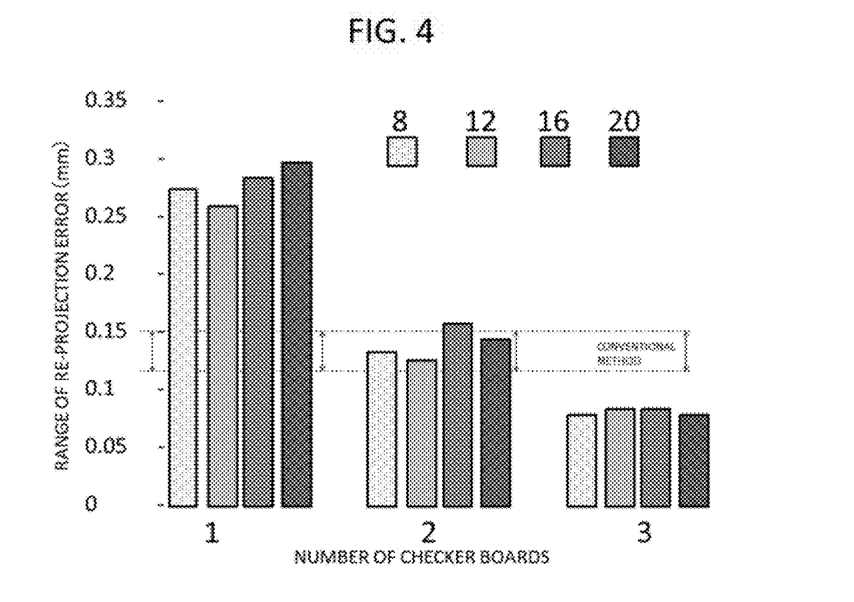
FIG. 4 is a precision verification graph (calibration).

FIG. 4 illustrates a result of evaluation.

According to the conventional method, a range of re-projection error was 0.12-0.15 (mm). Since the values largely vary in 10 tests, the result was adjusted so as to cover wider range.

In verification of the calibration of the present embodiment, the number of plane surfaces of the board was changed in a range of 1-3 surfaces. Further, the number of intersection points of the checker flag was changed to 8 points (=4×2), 12 points (=4×3), and 16 points (=4×4) for each surface.

In the present embodiment, since there was no obvious variation of values in 6 tests, the result was expressed by average values.

There was no obvious difference in any of the cases of 1-3 surfaces with respect to change of the number of intersection points of the checker flag, i.e., a change between 8 and 20 points. This result suggests that determination by operator is accurate enough than preliminary expected.

In a case where the board has a single surface, the result indicates less precision when compared with the conventional method. The board with a single surface is not practical in use since there occurs calculation error (which is also referred to as rank deficient). In a case where the board has two surfaces, the result indicates about the same level of precision as the conventional method. In a case where the board has three surfaces, the result indicates better precision than the conventional method.

Consequently, it is necessary for the calibration board to be made of at least two surfaces. It is more preferable for the calibration board to be made of more than three surfaces. Precision can be secured when the number of intersection points for each plane surface is 8-20 points.

~Effects~

Effects of the above described structure and operation will be described below.

According to the calibration in the present embodiment, calibration markers are selected by the mouse 3. This can be used by a person who is not an expert of image processing technology with the use of an intuitive interface.

Once the calibration board is arranged, frequent re-arrangement is not required. This can reduce operational efforts in calibration.

This requires no camera and has a simple structure. As a result, a load of calculation decreases.

Further, since no camera is required, a load of arrangement and setting in advance decreases. In other words, only required is arrangement of calibration board within a projection range of projector.

This achieves precision equal to or more than the conventional technology. Further, variation of errors becomes smaller.

Further, except for the calibration board 4, the projector 1, the personal computer 2, and the mouse 3 which are commercially available from mass retailers are employed. Also, the calibration board 4 can be made with ease. This allows easy building of system.

<Registration>

~Structure~

A structure related to the registration of the present embodiment will be described below. A projector system includes a projector 1, an image processing apparatus 2, and external input means 3. It is reasonable that the structure related to registration is added to the structure related to calibration. Here, for the sake of convenience, description will be made provided that both are independent from each other. The same reference numerals shall be attached to the corresponding structures and description thereof will be omitted here.

Figure 5:
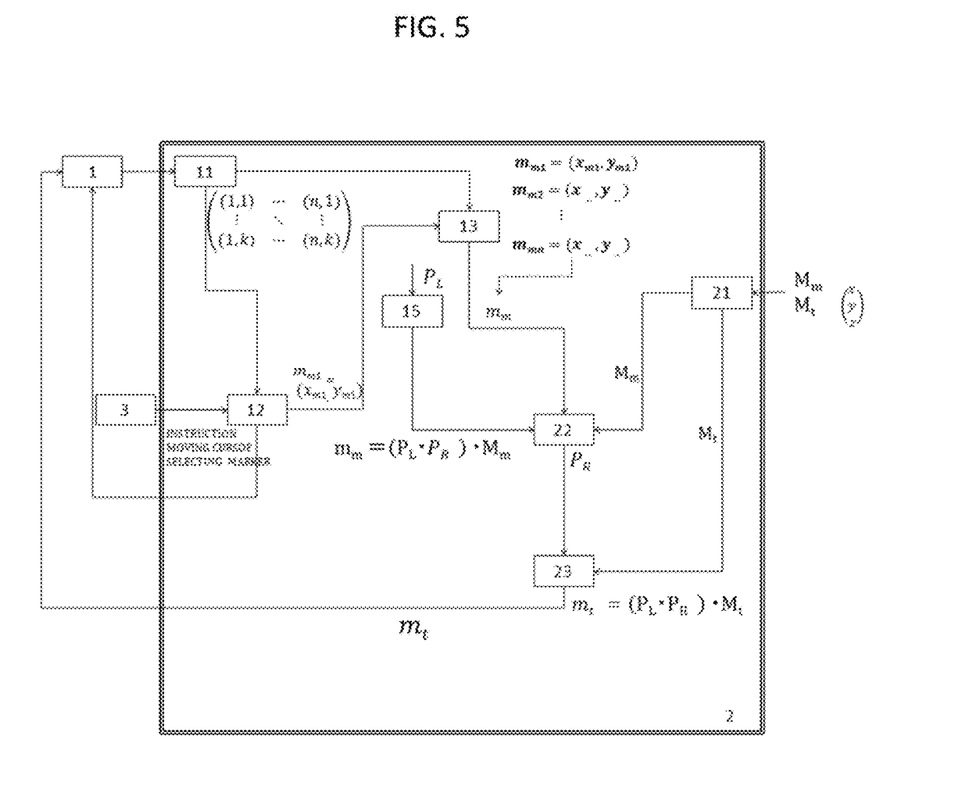
FIG. 5 is a functional block diagram of the image processing apparatus (registration).

FIG. 5 is a functional block diagram of the image processing apparatus 2. The image processing apparatus 2 includes a projection image coordinate system setting unit 11, a cursor operating unit 12, a cursor coordinates acquiring unit 13, a lens characteristics acquiring unit 15, a spatial coordinates inputting unit 21, and a projected object positional characteristics acquiring unit 22.

The above description is the structure related to the registration. In FIG. 5, a group of target projection image coordinate points acquiring unit 23 that is a structure related to target image projection is supplementary illustrated.

Structures of the projection image coordinate system setting unit 11, the cursor operating unit 12, and the cursor coordinates acquiring unit 13 are identical to the structures thereof related to calibration. The lens characteristics acquiring unit 15 inputs lens characteristics $P_L$ obtained by calibration.

Generally, a relationship between projection image coordinates and spatial coordinates is defined as described below. That is, $$m = (P_L \cdot P_R) \cdot M,$$

where m is projection image coordinates, $P_L$ is a matrix indicating lens characteristics (internal parameter), $P_R$ is a matrix indicating positional characteristics (external parameter), and M is spatial coordinates.

A surface of a projected object is preliminary provided with a plurality of registration markers. Therefore, a group of projection image coordinate points $m_m$ of registration markers can be acquired by the cursor operating unit 12 and the cursor coordinates acquiring unit 13.

In also the registration, a cursor projected from the projector 1 is employed as coordinates input interface.

The spatial coordinates inputting unit 21 inputs a group of spatial coordinate points $M_m$ of a plurality of registration markers provided on the surface of the projected object and a group of spatial coordinate points $M_t$ of a target within the projected object from the outside. Incidentally, if only for the purpose of registration, it is sufficient to only acquire the group of spatial coordinate points $M_m$ of registration markers.

The projected object positional characteristics acquiring unit 22 acquires projected object positional characteristics $P_R$ on the basis of the group of projection image coordinate points $m_m$ of registration markers and the group of spatial coordinate points $M_m$ of registration markers.

The group of target projection image coordinate points acquiring unit 23 acquires a group of projection image coordinate points $m_t$ of target on the basis of the lens characteristics $P_L$, the projected object positional characteristics $P_R$, and the group of spatial coordinate points $M_t$ of target.

~Operation~

Figure 6:
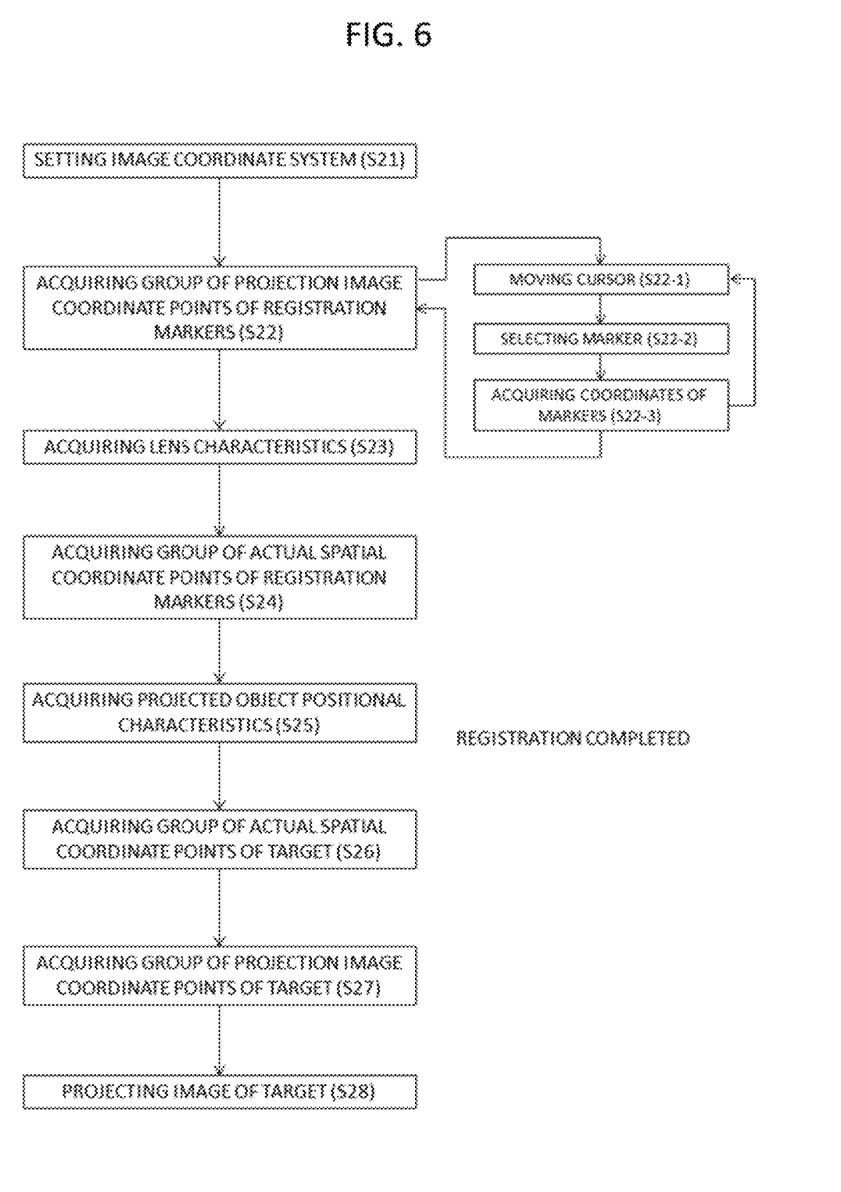
FIG. 6 is a processing flow chart of the image processing apparatus (registration).
Figure 7:
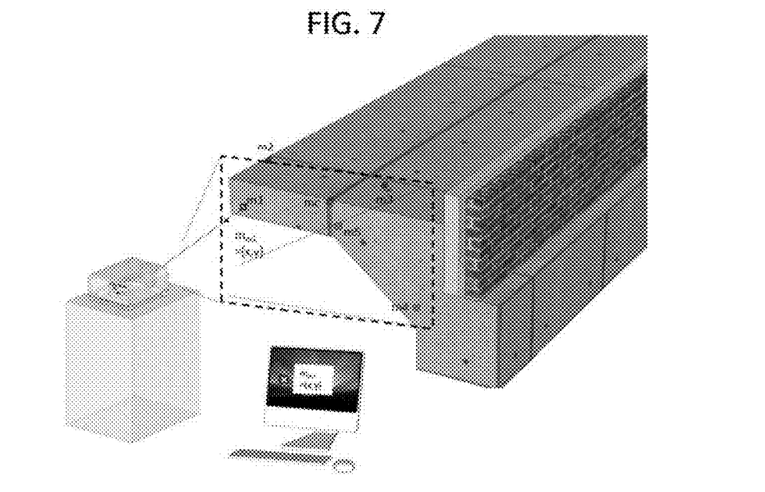
FIG. 7 is an operational conception diagram (registration).

Operation related to the registration of the present embodiment will be described below. FIG. 6 illustrates a processing flow of the image processing apparatus 2. FIG. 7 is an operational conception diagram related to the registration.

The image processing apparatus 2 inputs pixel information (e.g., 1280×800) of the projector 1 and sets a coordinate system of a projection image from the projector 1 (step S21).

The projector 1 is arranged in a manner that a projected object (specifically, all the registration markers) exists within a projection range of the projector 1.

A cursor is projected onto the projected object from the projector 1.

An operator operates the mouse 3 to move the cursor in synchronization with a position of the mouse 3 (step S22-1).

The operator, while seeing the cursor, operates the mouse 3, thereby placing the cursor onto a registration marker. In this state, the operator clicks the mouse 3, thereby selecting the registration marker (step S12-2).

The image processing apparatus 2 acquires projection image coordinates corresponding to the registration marker based on a selection instruction of the mouse 3 (step S22-3).

In FIG. 7, a dotted square suggests a projection image coordinate system. Further, FIG. 7 illustrates an example of obtaining projection image coordinates $m_{m1}$ corresponding to the registration marker $m_1$.

In a case of FIG. 7, 5 registration markers $m_1$ to $m_5$ are provided in balance. When considering balance between registration precision and operational efforts, the preferable number of registration markers is 5 to 8 points.

The image processing apparatus 2 acquires projection image coordinates corresponding to each of the 5 registration markers $m_1$-$m_5$ (repeating steps S22-1 to S22-3) and acquires a group of projection image coordinate points $m_m$ of the registration markers (step S22).

The image processing apparatus 2 acquires the lens characteristics $P_L$ obtained by calibration (step S23). Further, the image processing apparatus 2 inputs the group of spatial coordinate points $M_m$ of registration markers from the outside (step S24). The registration markers are preliminary given as three-dimensional coordinates.

The image processing apparatus 2 acquires projected object positional characteristics $P_R$ on the basis of the group of projection image coordinate points $m_m$ of registration markers, the group of spatial coordinate points $M_m$ of registration markers, and lens characteristics $P_L$ (step S25).

Accordingly, the registration is completed.

Subsequently, an operation related to target image projection of the present embodiment will be described below.

The group of spatial coordinate points $M_t$ of the target within the projected object is input from the outside (step S26). A spatial coordinates of the target is preliminary given as three-dimensional coordinates. Incidentally, the spatial coordinates may be acquired also at the time of executing step S24.

The image processing apparatus 2 acquires a group of projection image coordinate points $m_t$ of target on the basis of the lens characteristics $P_L$, the projected object positional characteristics $P_R$, and the group of spatial coordinate points $M_t$ of target (step S27).

The image processing apparatus 2 outputs the group of projection image coordinate points $m_t$ of target to the projector 1. The projector 1 projects an image related to the group of projection image coordinate points $m_t$ of target onto the projected object (step S28) (see, FIG. 10).

~Effects~

In also the registration, a cursor projected from the projector 1 is employed as an intuitive input interface. That is, effects equivalent to the effects described in the calibration can be produced.

Here, the calibration and the input of spatial coordinates from the outside are performed in advance.

Behavior that is actually performed by the operator immediately before the operation is only arrangement of the projector 1 at a proper position and selection of the several numbers of registration markers (5 points in the above operation) by using the mouse 3. By decreasing a load of operation related to the projection, the operator can devote himself into the primary operation while referring to auxiliary information provided by the projection image (see, Application Example).

<Registration Confirmation>

A structure related to the registration confirmation of the present embodiment will be described below. The structure is added to the structure related to registration. Common structures are given the same numeral numbers and descriptions thereof are omitted here.

The structure related to the registration confirmation is composed of two structures. One is a structure in which a registration marker is used (confirming operation 1). The other is a structure in which a confirmation marker is newly used (confirming operation 2). One or both of them may be used. For the convenience sake of description, illustration of an embodiment in which both of the confirming operation 1 and the confirming operation 2 are used is omitted here.

~Confirming Operation 1~

Figure 8:
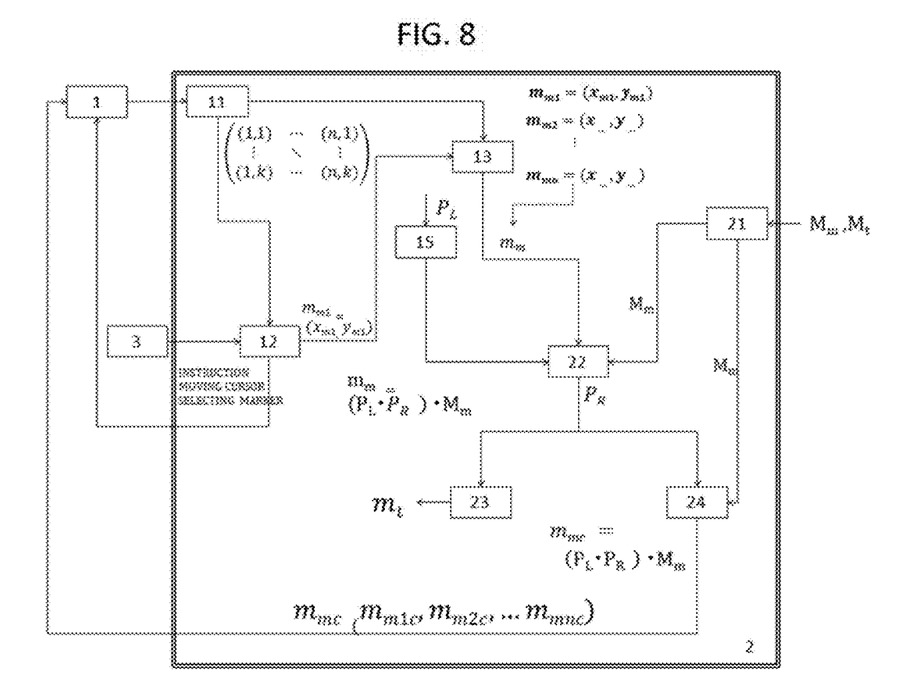
FIG. 8 is a functional block diagram of the image processing apparatus (registration confirmation).

FIG. 8 is a functional block diagram of the image processing apparatus 2. In FIG. 8, a group of registration marker confirming-projection image coordinates re-acquiring unit 24 is added to the functional block of FIG. 5.

The group of registration marker confirming-projection image coordinates re-acquiring unit 24 re-acquires a group of registration marker confirming-projection image coordinate points $m_{mc}$ on the basis of the lens characteristics $P_L$, the projected object positional characteristics $P_R$, and the group of spatial coordinate points $M_m$ of registration markers.

Incidentally, the group of projection image coordinate points $m_m$ of registration markers and the group of registration marker confirming-projection image coordinate points $m_{mc}$, are similar to but different from each other. The group of projection image coordinate points $m_m$ of registration markers can be obtained by selection of markers by the mouse 3, whereas the group of registration marker confirming-projection image coordinate points $m_{mc}$ is calculated by the image processing apparatus 2 on the basis of the already obtained $P_L$, $P_R$, and $M_m$. In other words, a registration result is not reflected on the group of projection image coordinate points $m_m$ of registration markers, while the registration result is reflected on the group of registration marker confirming-projection image coordinate points $m_{mc}$.

The image processing apparatus 2 outputs the group of registration marker confirming-projection image coordinate points $m_{mc}$ to the projector 1. The projector 1 projects an image related to the group of registration marker confirming-projection image coordinate points $m_{mc}$ onto a projected object. At the time, a different color is employed for the projection image from the color employed in selecting the registration markers by cursor (step S22).

If a confirmation image having a different color is projected onto the registration markers $m_1$-$m_5$, the operator visually confirms a fact that the registration is suitably done.

~Confirming Operation 2~

Figure 9:
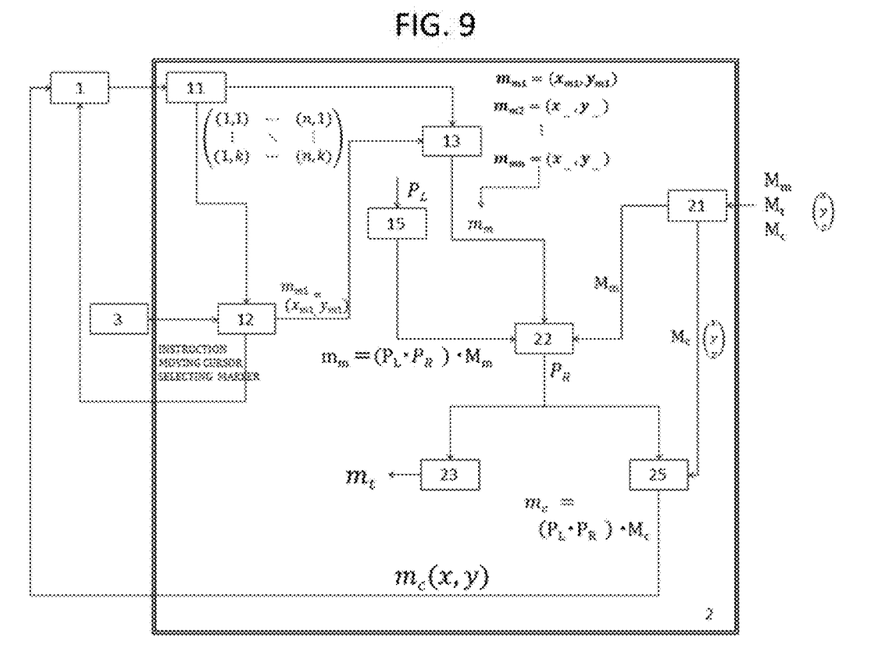
FIG. 9 is a functional block diagram of the image processing apparatus (registration confirmation).

FIG. 9 is a functional block diagram of the image processing apparatus 2. A confirmation marker projection image coordinates acquiring unit 25 is added to the functional block of FIG. 5.

Confirmation markers $m_c$ are provided on a surface of the projected object, in addition to the registration markers $m_1$-$m_5$ (see, FIG. 7). Spatial coordinates $M_c$ of the confirmation markers $m_c$ is preliminary given as three-dimensional coordinates.

The spatial coordinates inputting unit 21 inputs, in addition to the group of spatial coordinate points $M_m$ of registration markers and the group of spatial coordinate points $M_t$ of target, the spatial coordinates $M_c$ of the confirmation markers $m_c$ from the outside.

The confirmation marker projection image coordinates acquiring unit 25 acquires projection image coordinates $m_c$ of confirmation markers on the basis of the lens characteristics $P_L$, the projected object positional characteristics $P_R$, and the spatial coordinates $M_c$ of confirmation markers.

The image processing apparatus 2 outputs the projection image coordinates $m_c$ of confirmation markers to the projector 1. The projector 1 projects an image related to the projection image coordinates $m_c$ of confirmation markers onto the projected object. If the confirmation image is projected onto the confirmation markers $m_c$, the operator visually confirms a fact that the registration is suitably done.

Target users of the present application are users who are not an expert of image processing technology. If a user does not understand details of the image processing, in the confirming operation 1, the user may erroneously take to mean that the group of projection image coordinate points $m_m$ of registration markers selected by the operator himself by the mouse 3 is only re-projected. This cannot give a sense of security to the operator.

In the confirming operation 2, the confirmation image is projected onto the confirmation markers $m_c$ which are not selected by the operator himself. Therefore, the operator can understand that the confirmation image on the confirmation markers $m_c$ is the result of image processing, which can give a sense of security to the operator.

Application Example

Summary

The present invention is effective for visualizing an inner structure of a target object, of which inner structure is known, without destroying the target object. Hereinafter, descriptions are made about application examples thereof applied to ultrasonic survey for reinforcing steel rod placed in concrete, opening to the public for art object, road construction at an intersection, and sentinel lymph node biopsy.

In every case, it is premised that an operator is an expert in his field, who is, however, poor at professional knowledge of image processing technology.

Further, except for the calibration board 4, a projector 1, a personal computer 2, and a mouse 3 which are commercially available from mass retailers are employed. In other words, the system can be easily constructed. The projection technology of the present application can be easily applied to the existing technologies of different fields.

Application Example 1

Figure 10:
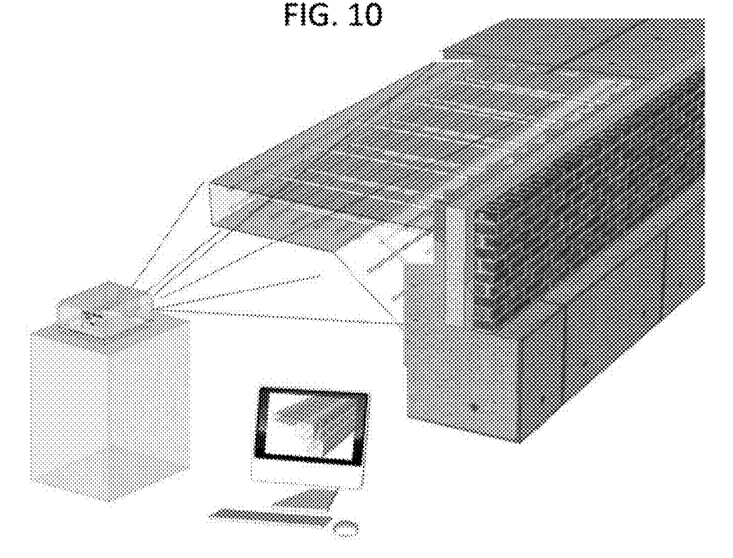
FIG. 10 illustrates Application Example 1.

FIG. 10 schematically illustrates Application Example 1.

Even in a case where no damage of a concrete-made construction is visually found after earthquake, an inner reinforcing steel rod may be damaged. In this case, the ultrasonic survey of the reinforcing steel rod is performed from the surface of concrete, thereby confirming if the reinforcing steel rod is sound.

The calibration is performed in advance by using the calibration board 4. Spatial coordinates of the concrete construction and spatial coordinates of the layout of reinforcement are preliminary set in advance on the basis of design drawing.

The registration markers are provided at predetermined positions on the surface of the concrete construction. The position information is prepared in advance as spatial coordinates.

After completing the above described preparation, an image of layout of reinforcement is projected onto the concrete construction.

While referring to the projection image, a position of a target reinforcing steel rod is estimated, and the ultrasonic survey is performed thereto. Visualization enables specification of a target object, resulting in contributing to improvement of precision of the survey.

Only a simple registration operation is required to be performed at the time of investigation. Therefore, the investigator can devote himself into the investigation without being bothered by the projecting operation.

Application Example 2

Figure 11:
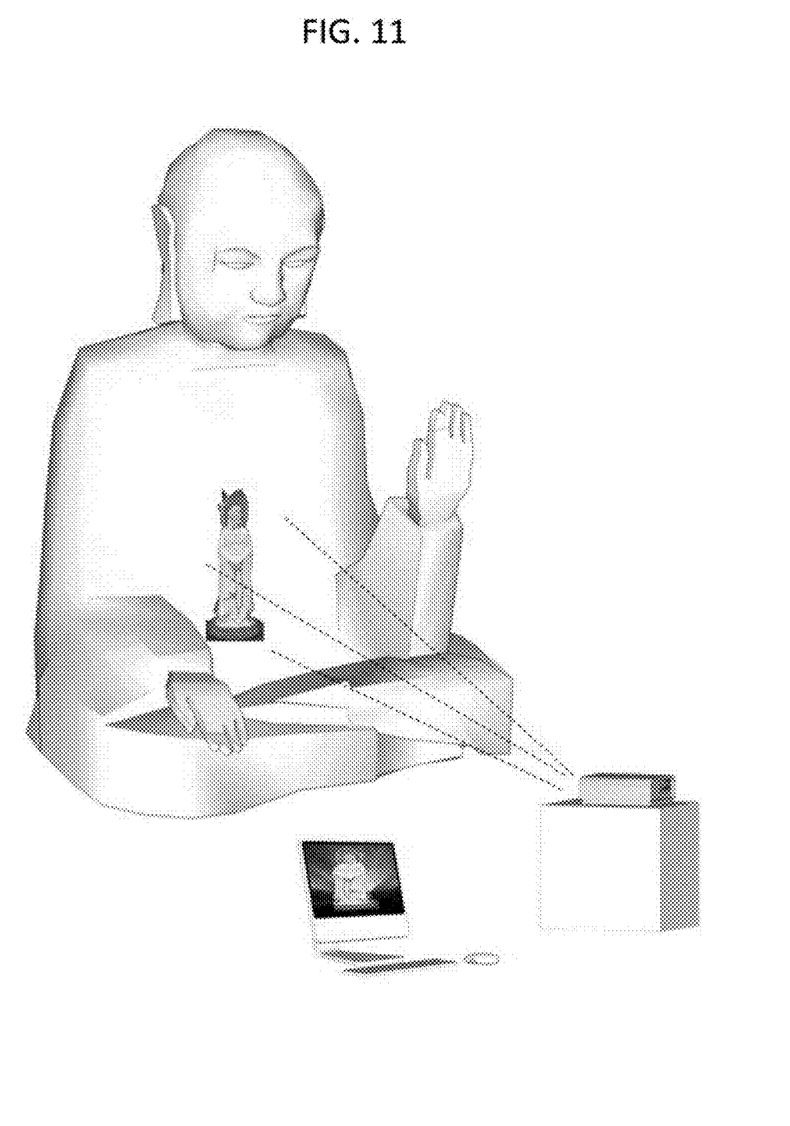
FIG. 11 illustrates Application Example 2.

FIG. 11 schematically illustrates Application Example 2.

It was found that a small religious sculpture is placed within a large religious sculpture by investigation of old documents. CT investigation also supported the fact. A curator of a museum has an idea of placing the religious sculpture open to the public in a more interesting way.

The calibration is performed in advance by using the calibration board 4. Spatial coordinates of the large religious sculpture and spatial coordinates of the small religious sculpture are set in advance on the basis of CT image information.

Registration markers are given to predetermined positions on a surface of the large religious sculpture. The CT image information is prepared including information of the registration markers.

After completing the above described preparation, an image related to the small religious sculpture is projected onto the large religious sculpture.

Visualization by using the projection image can support imagination of viewers, which can give deeper understanding of religious art to also general viewers who have a little knowledge about the art.

Only a simple registration operation is required to be performed in a viewing room of the museum. Therefore, the curator can devote himself into explanation to general viewers without being bothered by the projecting operation.

Application Example 3

Figure 12:
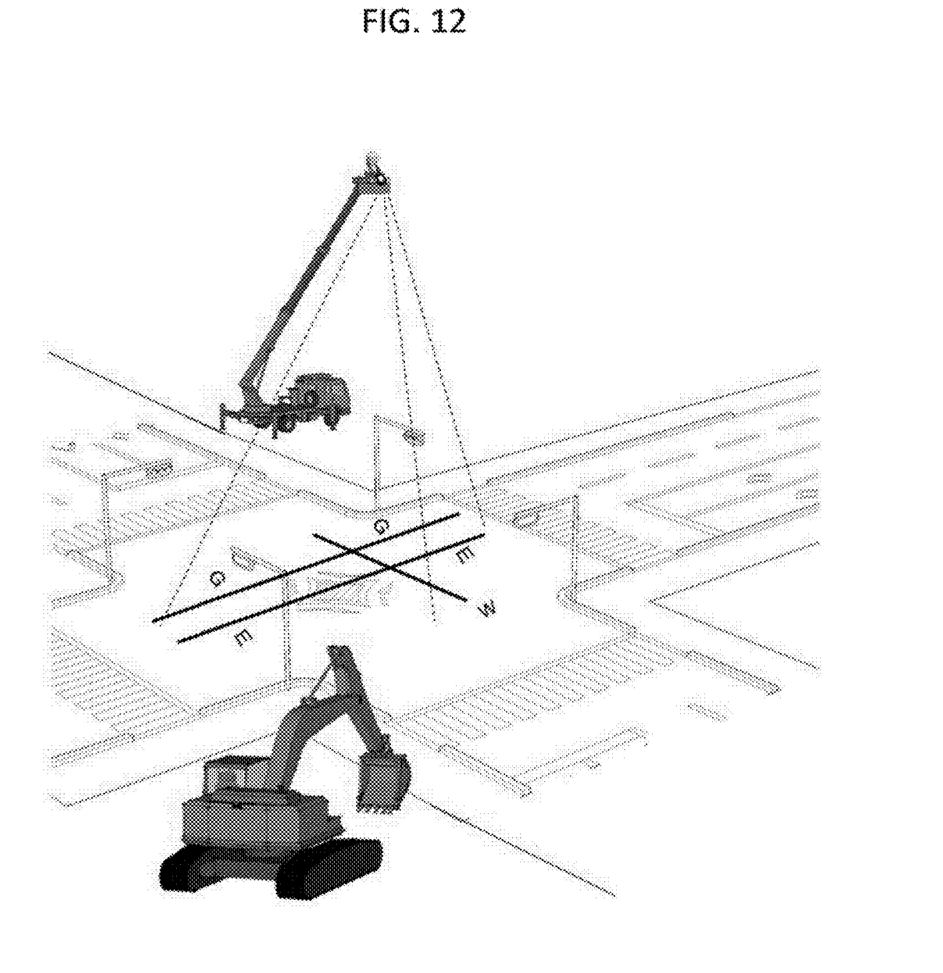
FIG. 12 illustrates Application Example 3.

FIG. 12 schematically illustrates Application Example 3.

A plurality of lifelines is buried at intersections in the city in a complicated way. Therefore, if lifeline is cut, the city function will possibly be collapsed. Therefore, when constructing roads, detailed consultation with relating departments is executed in advance, and thereafter excavation of road is carefully executed.

The calibration is performed in advance by using the calibration board 4. Spatial coordinates of road and spatial coordinates of lifeline are prepared in advance on the basis of design drawing.

Registration markers are given to predetermined positions on the surface of the road.

The position information is prepared in advance as spatial coordinates. The projector is set in a high place by using an aerial vehicle.

After completing the above described preparation, an image of lifeline is projected onto the road.

While referring to the projection image, a position of lifeline is estimated, and excavation of road is carefully performed while avoiding the lifeline. Visualization can decrease a load of an operator of a hydraulic excavator.

Only a simple registration operation is required at the construction site. Therefore, a person engaged in construction can devote himself into the primary construction work without being bothered by the projecting operation.

Application Example 4

Sentinel lymph node biopsy is performed in order to confirm progression of breast cancer. The sentinel lymph node is a lymph node where cancer cell which has entered into a lymph duct initially comes up and is used for checking whether or not the cancer spreads to the lymph duct. The sentinel lymph node is identified, to which a biopsy needle is inserted, to collect body tissue.

The calibration is performed in advance by using the calibration board 4. Spatial coordinates of the body surface and spatial coordinates of the lymph duct are set in advance on the basis of CT image information.

Registration markers are given to predetermined positions on the body surface. The CT image information is prepared including information of the registration markers.

After completing the above described preparation, an image of lymph duct is projected onto the body surface.

With reference to the projection image, an image of the lymph duct is estimated, a biopsy needle is inserted into the lymph duct, and body tissue is collected therefrom. Visualization can decrease a load of an operator.

Only a simple registration operation is required at the time of collecting body tissue. Therefore, the operator can devote himself into an operation without being bothered by the projecting operation.

<Supplementary>

A difference between the conventional technology and the present invention will be simplified and described again. Further, the difference will be studied, and supplemental description will be made on points which could not satisfactory described in this specification.

In the calibration of the conventional technology in which a camera was used, only if the camera, a projector, a target object to be projected, and a light source were properly arranged, the operational equipment performed the calibration. In other words, the calibration was performed automatically, which made the calibration operation put into a black box.

In the present invention, not a camera but a cursor projected from the projector is used as an intuitive input interface, thereby acquiring projection image coordinates of calibration markers. More specifically, the calibration operation is performed semi-automatically (semi-manually). There is partial determination of operator, which makes the operation intuitive.

The projection object and the projected object (see, Application Example) which are handled in the present application are totally different from each other and cannot be handled uniformly. As a result, the conventional technology which was put in a black box was hard to be handled by a user who was not an expert of image processing technology.

In other words, the conventional technology which is put in a black box is re-designed in a manner that an amateur can use it with ease on the assumption that the technology is used in the most general circumstance. If provided that the technology is used in the general circumstance, it is easy for an amateur to use it. Conversely, when the use environment changes one by one as is the case of the present application, since the technology is put in a black box, it is impossible for an amateur to handle it.

To the contrary, since the present invention is intuitive, it is possible even for an amateur to handle it even when the use environment differs in individual case. A user who is not an expert of image processing technology also can use it with ease.

As described above, the inventor focused on a fact that automatic is not perfect.

At the step of getting an idea, it is deemed that good handling ability and precision have a trade-off relationship.

The conventional technology is automatic, whereas the invention of the present application is semi-automatic. That is, determination of operator is unavoidable in the present invention. As a result, it was predicted that variation and errors became larger in the present invention.

The inventor quantitatively evaluated the variation and errors resulting from the determination of the operator by testing it. The inventor found that, based on the test result, the present invention had precision equivalent to or more than the precision of the conventional technology and had less variation, contrary to the expectation (see, the above described details). Further, the inventor studied the test result.

The high precision produced by the conventional technology is realized provided that an expert of image processing technology properly arranges a camera, a projector, a target object to be projected, and a light source. At the time of arrangement and setting, experiment and know-how of expert has already been reflected thereto.

Therefore, when a user who is not an expert of image processing technology is targeted as in the case of the present application, the above described result (result contrary to the expectation) is obtained.

As described above, the present invention has both of the good handling ability and fine precision. That is, the present invention has no trade-off relationship therebetween.

As described above, the inventor focused on a root cause of the problem of the conventional technology.

The inventor of the present application completed the invention of the present application after tried and studied in a manner as described above.

REFERENCE CHARACTER LIST

1 projector
2 image processing apparatus 3 external input means
4 calibration board
11 projection image coordinate system setting unit
12 cursor operating unit
13 cursor coordinates acquiring unit
14 projector characteristics acquiring unit
15 lens characteristics acquiring unit
21 spatial coordinates inputting unit
22 projected object positional characteristics acquiring unit
23 group of target projection image coordinate points acquiring unit
24 group of registration marker confirming-projection image coordinates re-acquiring unit
25 confirmation marker projection image coordinates acquiring unit

The invention claimed is:

1. A projector system comprising:
a projector;
an image processing apparatus;
external input means; and
a calibration board;
wherein the calibration board is made of at least two plane surfaces, each plane surface including a plurality of calibration markers arranged so as to form a regular matrix; and
wherein the image processing apparatus comprises
a projection image coordinate system setting unit for setting a coordinate system of a projection image from the projector,
a cursor operating unit for operating a cursor projected from the projector on the basis of position information from the external input means,
a cursor coordinates acquiring unit which determines, when the cursor moves to an arbitrary position, the arbitrary position as a selected position based on a selection instruction from the external input means and acquires projection image coordinates corresponding to the cursor at the selected position,
a projector characteristics acquiring unit for acquiring projector characteristics for each plane surface on the basis of a group of projection image coordinate points of the calibration markers acquired by the cursor operating unit and the cursor coordinates acquiring unit and a group of known spatial coordinate points of the calibration markers, and
a lens characteristics acquiring unit which, on the basis of the projector characteristics of each plane surface, removes calibration board positional characteristics of each plane surface and acquires lens characteristics of the projector.

2. A projector system according to claim 1, wherein the image processing apparatus further comprises
a spatial coordinates inputting unit for inputting a group of spatial coordinate points of a plurality of registration markers provided on a surface of a projected object, and
a projected object positional characteristics acquiring unit for acquiring projected object positional characteristics on the basis of the group of projection image coordinate points of the registration markers acquired by the cursor operating unit and the cursor coordinates acquiring unit, the group of spatial coordinate points of the registration markers, and the lens characteristics.

3. A projector system according to claim 2,
wherein the spatial coordinates inputting unit further inputs a group of spatial coordinate points of a target within the projected object; and
wherein the image processing apparatus further comprises a group of target projection image coordinate points acquiring unit for acquiring a group of projection image coordinate points of target on the basis of the lens characteristics, the projected object positional characteristics, and the group of spatial coordinate points of target.

4. A projector system according to claim 2, wherein the image processing apparatus further comprises a group of registration marker confirming-projection image coordinates re-acquiring unit for re-acquiring a group of registration marker confirming-projection image coordinate points on the basis of the lens characteristics, the projected object positional characteristics, and the group of spatial coordinate points of registration markers.

5. A projector system according to claim 2,
wherein the spatial coordinates inputting unit inputs spatial coordinates of the confirmation markers provided on a surface of the projected object; and
wherein the image processing apparatus further comprises a confirmation marker projection image coordinates acquiring unit for acquiring projection image coordinates of confirmation markers on the basis of the lens characteristics, the projected object positional characteristics, and the spatial coordinates of confirmation markers.

6. A projector system according to claim 1,
wherein the calibration board is provided with a checker flag pattern; and
wherein the calibration marker serves as an intersection point of the checker flag.

7. A projector system according to claim 6, wherein the number of intersection points of the checker flag is 8-20 points.

8. A calibration method for a projector system, the projector system comprising a projector, an image processing apparatus, external input means, and a calibration board,
wherein the calibration board is made of at least two plane surfaces, each plane surface including a plurality of calibration markers arranged so as to form a regular matrix; and
wherein the image processing apparatus
sets a coordinate system of a projection image from the projector,
operates a cursor projected from the projector on the basis of position information from the external input means,
determines, when the cursor moves onto a calibration marker, that the calibration marker is selected based on a selection instruction from the external input means and acquires projection image coordinates corresponding to the selected calibration marker,
acquires projection image coordinates corresponding to the plurality of calibration markers and acquires the group of projection image coordinate points of calibration markers,
acquires projector characteristics for each plane surface on the basis of the group of projection image coordinate points of calibration markers and a group of known spatial coordinate points of calibration markers, and
removes calibration board positional characteristics of each plane surface and acquires lens characteristics of the projector, on the basis of the projector characteristics of each plane surface.

* * * * *